(12) United States Patent
Lee et al.

(10) Patent No.: US 12,337,657 B2
(45) Date of Patent: Jun. 24, 2025

(54) INTEGRATED THERMAL MANAGEMENT CIRCUIT FOR VEHICLES

(71) Applicants: Hyundai Motor Company, Seoul (KR); Kia Corporation, Seoul (KR)

(72) Inventors: Sang Shin Lee, Gyeonggi-Do (KR); Ki Mok Kim, Gyeonggi-Do (KR); Man Ju Oh, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 269 days.

(21) Appl. No.: 17/696,526

(22) Filed: Mar. 16, 2022

(65) Prior Publication Data
US 2022/0410661 A1 Dec. 29, 2022

(30) Foreign Application Priority Data
Jun. 29, 2021 (KR) .......................... 10-2021-0085069

(51) Int. Cl.
*B60H 1/00* (2006.01)
*B60H 1/22* (2006.01)

(52) U.S. Cl.
CPC ..... *B60H 1/00921* (2013.01); *B60H 1/00278* (2013.01); *B60H 2001/00307* (2013.01);
(Continued)

(58) Field of Classification Search
CPC ............ B60H 1/00921; B60H 1/00278; B60H 2001/00307; B60H 2001/00928;
(Continued)

(56) References Cited

U.S. PATENT DOCUMENTS

| 4,901,791 A * | 2/1990 | Kadle | F25B 39/04 |
| | | | 165/173 |
| 2018/0208019 A1* | 7/2018 | Sugimura | B60H 1/00735 |

(Continued)

FOREIGN PATENT DOCUMENTS

| CN | 110154683 A * | 8/2019 | |
| DE | 112014004273 T5 * | 6/2016 | ......... B60H 1/00385 |

(Continued)

OTHER PUBLICATIONS

<div class="csl-entry">Editors of the American Heritage Dictionaries (Ed.). (2013). Subsequently. In <i>American Heritage Roget's Thesaurus</i> (1st ed.). Houghton Mifflin. https://search.credoreference.com/articles/Qm9va0FydGljbGU6MzE3ODYzNg ==?aid=279753</div> (Year: 2013).*

*Primary Examiner* — Tavia Sullens
*Assistant Examiner* — Esmeralda Arreguin-Martinez
(74) *Attorney, Agent, or Firm* — Morgan, Lewis & Bockius LLP (57) ABSTRACT

An integrated thermal management circuit for vehicles, includes a refrigerant line configured so that a refrigerant subsequently flows into a compressor and a refrigerant heater, the refrigerant discharged from the refrigerant heater passes through an internal condenser or an integrated chiller and then flows into an external condenser, and the refrigerant discharged from the external condenser passes through the integrated chiller or an evaporator and then flows into the compressor, a battery cooling line configured so that a coolant circulates between a battery and an integrated radiator or the integrated chiller, an electronic part cooling line configured so that the coolant circulates between an electronic driving unit and the integrated radiator or the integrated chiller, and a heat radiation control valve provided between the refrigerant heater and the internal condenser on (Continued)

the refrigerant line and configured to control an amount of heat radiated by the internal condenser.

15 Claims, 6 Drawing Sheets

(52) U.S. Cl.
CPC .............. *B60H 2001/00928* (2013.01); *B60H 2001/00949* (2013.01)

(58) Field of Classification Search
CPC ...... B60H 2001/00949; B60H 1/00385; B60H 1/00392; B60H 1/00899; B60H 1/00285; B60H 2001/00128; B60H 1/00885; B60H 1/00271; B60H 2001/00957; F25B 2400/0401; F25B 2400/0409; F25B 2339/0444
See application file for complete search history.

(56) References Cited

U.S. PATENT DOCUMENTS

2020/0101816 A1\* 4/2020 Takagi ............... B60H 1/00328
2020/0189357 A1\* 6/2020 Chopard ............ B60H 1/00499

FOREIGN PATENT DOCUMENTS

| KR | 20150098984 A | \* | 8/2015 | ......... B60H 1/00899 |
| KR | 10-2019-0124032 | | 11/2019 | |

\* cited by examiner

INTEGRATED THERMAL MANAGEMENT CIRCUIT FOR VEHICLES

CROSS-REFERENCE TO RELATED APPLICATION

The present application claims priority to Korean Patent Application No. 10-2021-0085069, filed on Jun. 29, 2021, the entire contents of which is incorporated herein for all purposes by this reference.

BACKGROUND OF THE PRESENT DISCLOSURE

Field of the Present Disclosure

The present disclosure relates to an integrated thermal management circuit for vehicles, and more particularly to, an integrated thermal management circuit for vehicles which may increase the number of components to reduce the weight and production cost of the circuit, may increase space utilization of an engine compartment, and may independently perform heating of the interior of the vehicle and rise in the temperature of a battery through a refrigerant heater in accordance with a heat management mode.

Description of Related Art

Recently, the number of domestic registered eco-friendly vehicles tends to be increased in keeping with an eco-friendly vehicle distribution expansion policy and preference for vehicles having high fuel efficiency. An electric vehicle, which is a kind of eco-friendly vehicle, travels using an electric battery and an electric motor rather than petroleum-based oil fuel and an engine. The electric vehicle is driven by rotating the motor using electricity stored in the battery, and thus exhausts no harmful substances, generates no noise and has high energy efficiency.

A conventional vehicle using the power of an engine operates a heating system using the waste heat of the engine, but the electric vehicle without an engine operates a heater using electricity. Therefore, when the interior of the electric vehicle is heated, the range of the electric vehicle is greatly reduced.

Furthermore, a battery module may maintain the optimum performance and a long lifespan only when it is used under the optimal temperature conditions. However, the battery module has difficulty in being used under the optimal temperature conditions due to heat generated while driving of the battery module and external temperature change.

To solve such a problem, measures to organically combine an air conditioning system and a thermal management system of the electric vehicle are being vigorously discussed.

A conventionally thermal management circuit using an integrated chiller, which exchanges heat with an electronic driving unit and a battery, utilizes a coolant heater to raise the temperature of a battery in a harsh cold environment. However, because the coolant heater is generally provided upstream of the battery on a battery coolant line in the same manner as the integrated chiller, and heats a coolant flowing into the battery to provide the heated coolant to the battery, when the temperature of the battery is raised through the coolant heater, the waste heat of the electronic driving unit is recovered through the integrated chiller, and thus, the waste heat is not capable of being used in heating the interior of the vehicle and the heat management efficiency of the vehicle is lowered.

Furthermore, in case of heating of the interior of the vehicle, one internal condenser is used to adjust both the temperature of front seats and the temperature of rear seats, the temperatures of the respective seats are adjusted by adding cold air in accordance with the target temperatures of the respective seats, and thus, thermal efficiency is lowered.

Therefore, development of an integrated thermal management circuit, which may implement various driving modes and have predetermined thermal efficiency while including an integrated chiller and an integrated radiator, is required.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an integrated thermal management apparatus of vehicles, in which a refrigerant line, a battery cooling line and an electronic part cooling line may be respectively provided, recovery of waste heat of an electronic driving unit and cooling of a battery may be performed through one integrated chiller, various thermal management modes, such as heating of the interior of a vehicle through a heat pump, rise in the temperature of the battery, etc., may be independently performed by directly heating a refrigerant discharged from a compressor through a refrigerant heater, and heating temperatures of front seats and rear seats may be adjusted during heating of the interior of the vehicle by controlling the flow rate of the refrigerant heated by the refrigerant heater at the inlet of an internal condenser including two independent flow paths.

In accordance with various aspects of the present disclosure, the above and other objects may be accomplished by the provision of an integrated thermal management apparatus of vehicles, including a refrigerant line configured so that a refrigerant subsequently flows into a compressor and a refrigerant heater, the refrigerant discharged from the refrigerant heater passes through an internal condenser of an indoor air conditioning apparatus or an integrated chiller and then flows into an external condenser, and the refrigerant discharged from the external condenser passes through the integrated chiller or an evaporator of the indoor air conditioning apparatus and then flows into the compressor, a battery cooling line configured so that a coolant circulates between a battery and an integrated radiator or between the battery and the integrated chiller, an electronic part cooling line configured so that the coolant circulates between an electronic driving unit and the integrated radiator or between the electronic driving unit and the integrated chiller, and a heat radiation control valve provided between the refrigerant heater and the internal condenser on the refrigerant line and configured to adjust a flow rate of the refrigerant flowing into the internal condenser to control an amount of heat radiated by the internal condenser during heating of an interior of a vehicle.

The refrigerant, evaporated by the integrated chiller or the evaporator, on the refrigerant line may be compressed by the compressor, may be heated by the refrigerant heater, and may be cooled while sequentially passing through the internal condenser and the external condenser, or may be cooled while sequentially passing through the integrated chiller and the external condenser.

The refrigerant heater may heat the refrigerant discharged from the compressor and supply the heated refrigerant to the internal condenser, and the heat radiation control valve may control a temperature of the refrigerant supplied to the internal condenser by adjusting a flow rate of the heated refrigerant.

A first flow path and a second flow path separated from each other so that the refrigerant independently flows therein may be provided in the internal condenser, and the heat radiation control valve may distribute the refrigerant discharged from the refrigerant heater to supply the refrigerant to the first flow path and the second flow path, and may adjust flow rates of the refrigerant supplied to the first flow path and the second flow path.

The first flow path and the second flow path of the internal condenser may respectively radiate heat during heating of the interior of the vehicle, the heat radiated by the first flow path may be used to heat seats in a first row, and the heat radiated by the second flow path may be used to heat seats in a second row.

A first control valve may be provided at a junction among downstream areas of the integrated radiator and the integrated chiller and an upstream area of the electronic driving unit, and the first control valve may open or close a port toward the integrated radiator or a port toward the integrated chiller in accordance with a thermal management mode of the electronic driving unit to adjust flow of the coolant flowing into the electronic driving unit.

The first control valve may be a three-way valve, and the first control valve may close the port toward the integrated chiller in an outdoor air cooling mode of the electronic driving unit, and may close the port toward the integrated radiator in an electronic part waste heat recovery mode of the electronic driving unit.

A second control valve may be provided at a junction among downstream areas of the integrated radiator and the integrated chiller and an upstream area of the battery, and the second control valve may open or close a port toward the integrated radiator or a port toward the integrated chiller in accordance with a thermal management mode of the battery to adjust flow of the coolant flowing into the battery.

The second control valve may be a three-way valve, and the second control valve may close the port toward the integrated chiller in an outdoor air cooling mode of the battery, and may close the port toward the integrated radiator in a chiller cooling mode or a temperature rise mode of the battery.

A third control valve may be provided at a junction among downstream areas of the refrigerant heater and the external condenser and an upstream area of the integrated chiller, and a fourth control valve may be provided at a junction between a downstream area of the integrated chiller and an upstream area of the external condenser.

The third control valve and the fourth control valve may open or close ports toward the refrigerant heater, ports toward the external condenser or ports toward the compressor in accordance with a thermal management mode of the battery or a cooling or heating mode of the vehicle to adjust a flow rate of the refrigerant flowing into the integrated chiller.

The third control valve and the fourth control valve may be three-way valves, and the third control valve may close the port toward the external condenser and the fourth control valve may close the port toward the compressor in a temperature rise mode of the battery.

The third control valve and the fourth control valve may be three-way valves, and the third control valve may close the port toward the refrigerant heater and the fourth control valve may close the port toward the external condenser in an internal heating mode of the vehicle.

An expansion valve may be provided upstream of the external condenser, upstream of the integrated chiller or upstream of the evaporator, and the refrigerant passing through the expansion valve provided upstream of the external condenser, upstream of the integrated chiller or upstream of the evaporator may be selectively expanded in accordance with a cooling or heating mode of the vehicle.

When a battery temperature rise mode is performed on the battery cooling line, the coolant circulating along the battery cooling line may exchange heat with the refrigerant, heated by the refrigerant heater, in the integrated chiller to raise a temperature of the battery.

An expansion valve may be provided upstream of the external condenser, and the refrigerant circulating along the refrigerant line may be compressed by the compressor, may be condensed by the integrated chiller, may be expanded by the expansion valve provided upstream of the external condenser and may be evaporated by the external condenser to implement the battery temperature rise mode.

The integrated radiator may include an electronic part radiator connected to the electronic part cooling line and a battery radiator connected to the battery cooling line, and the electronic part radiator and the battery radiator may be individually provided as respective parts or be integrated into one part.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Reference will now be made in detail to the exemplary embodiments of the present disclosure, examples of which are illustrated in the accompanying drawings.

Figure 1:
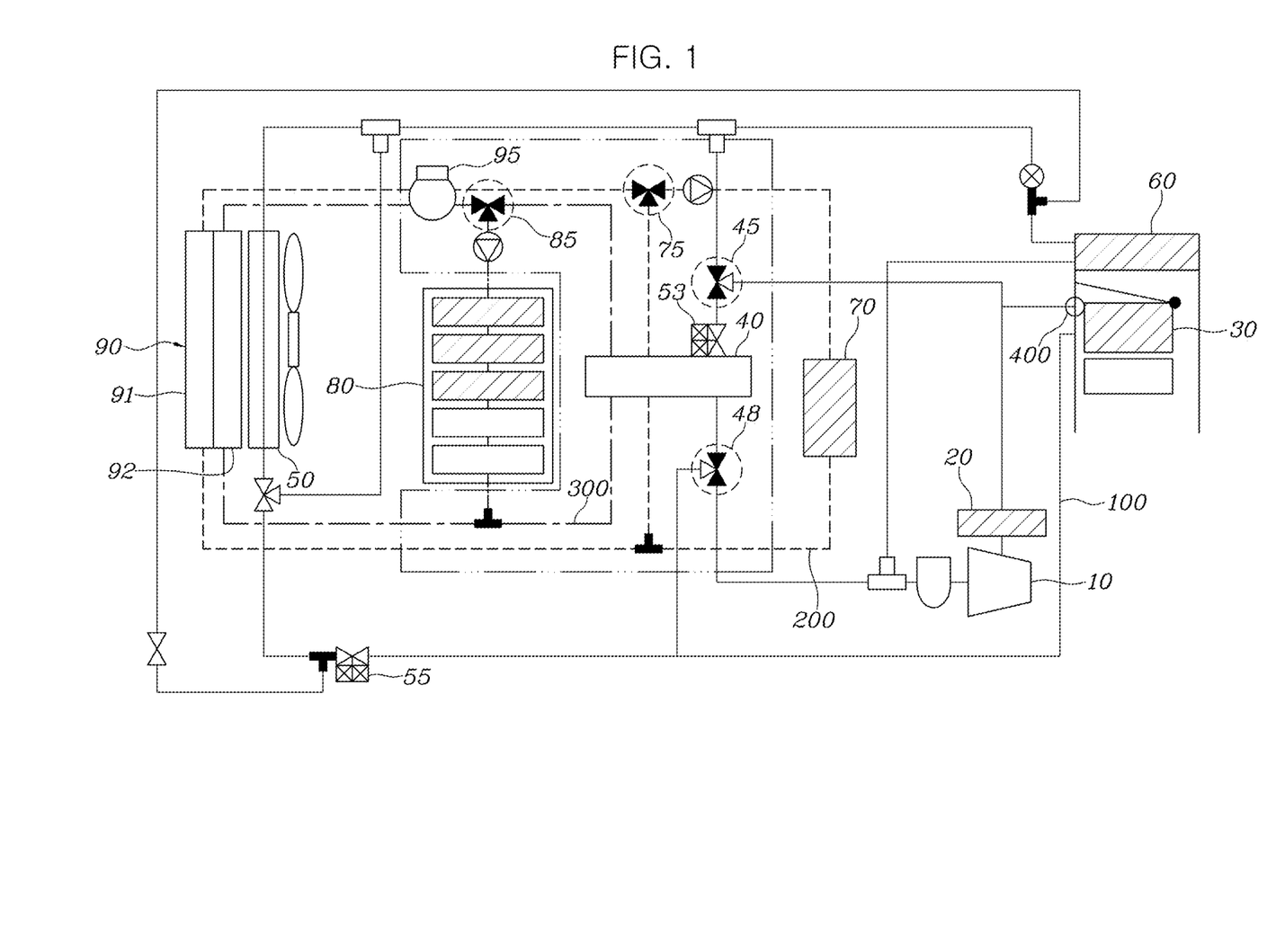
FIG. 1 is a schematic view exemplarily illustrating an integrated thermal management circuit for vehicles according to various exemplary embodiments of the present disclosure.
Figure 2:
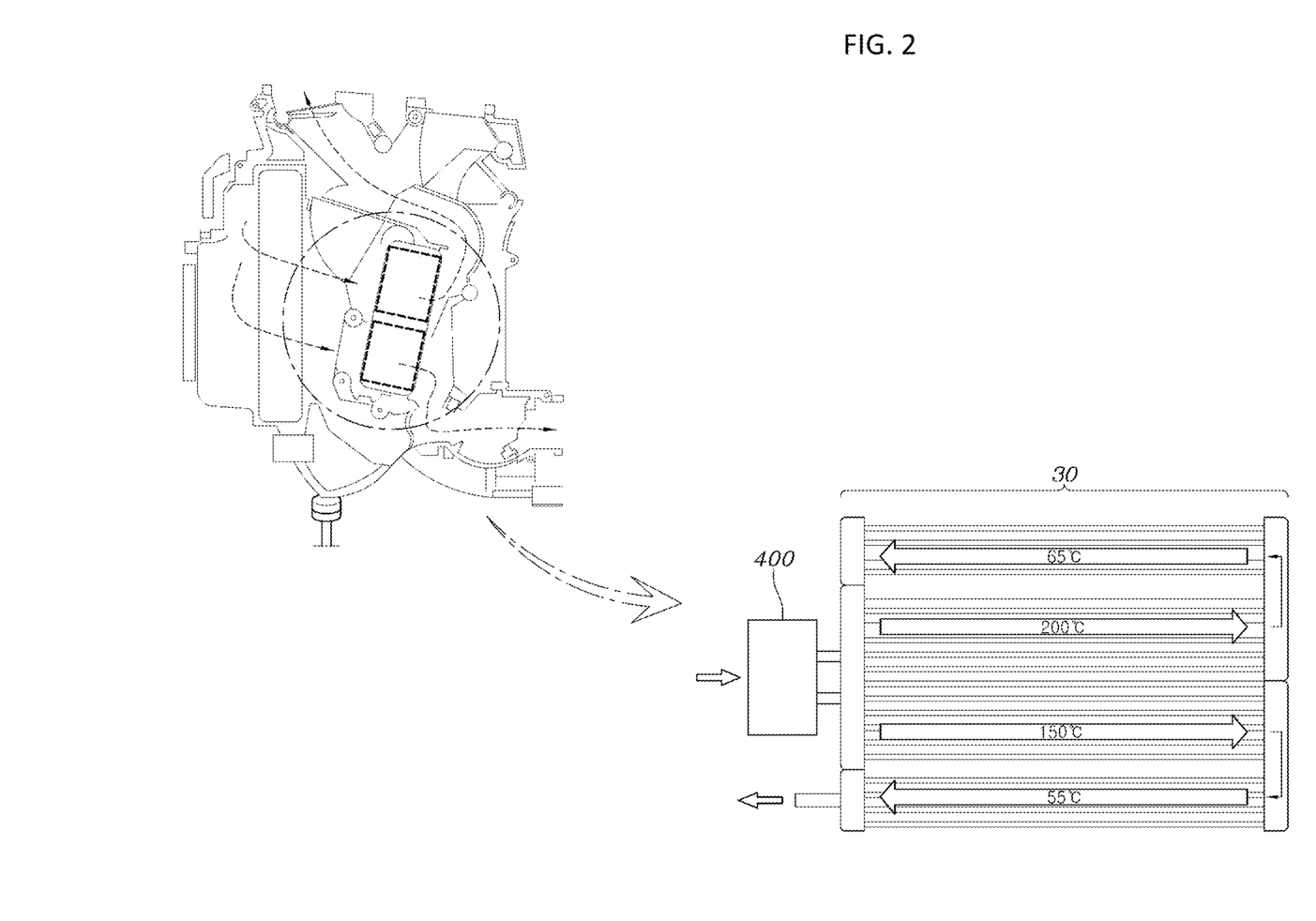
FIG. 2 is a view exemplarily illustrating a first flow path and a second flow path of an internal condenser in the integrated thermal management circuit for vehicles according to various exemplary embodiments of the present disclosure.
Figure 3:
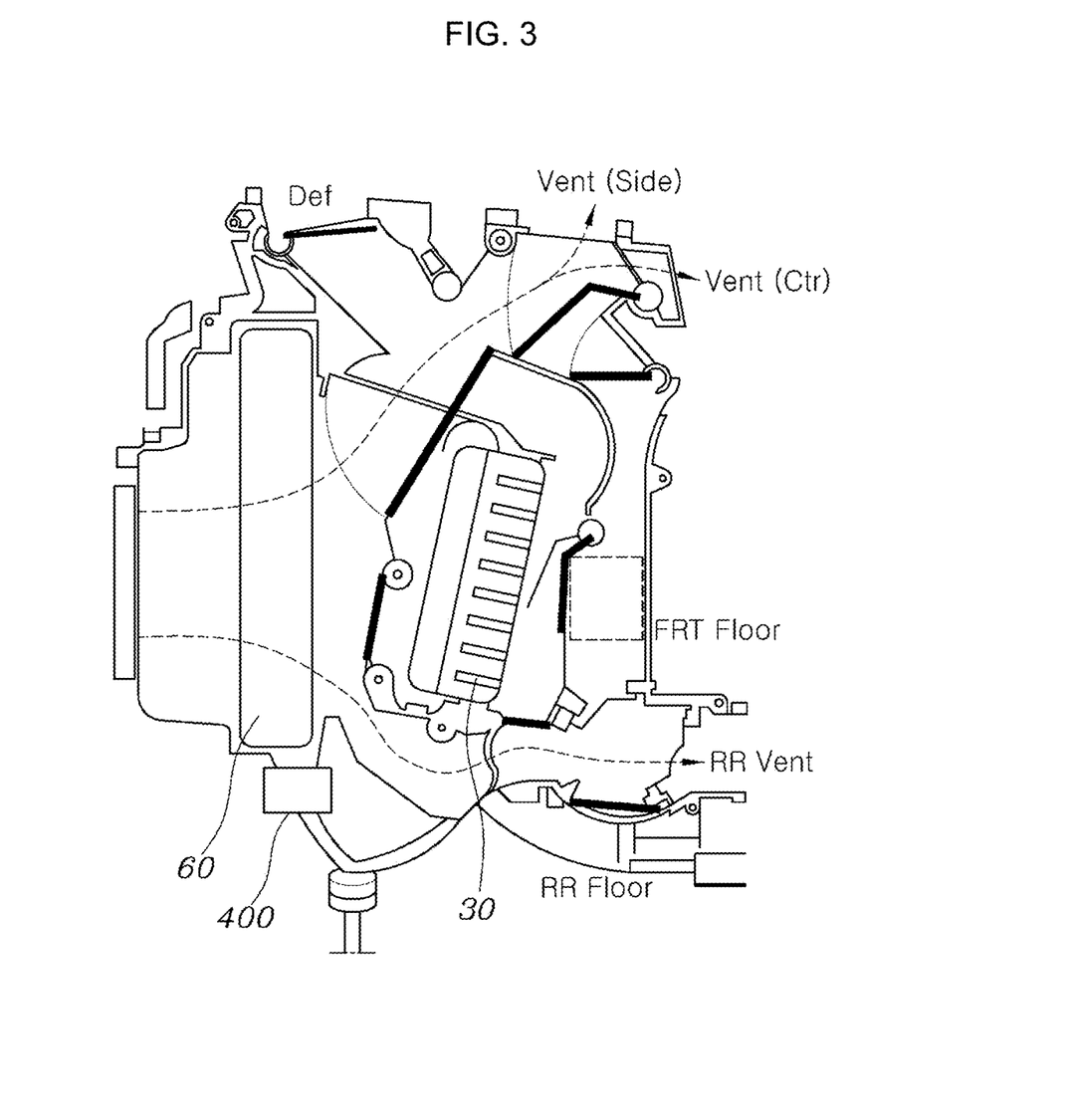
FIG. 3 is a view exemplarily illustrating air flow when the internal condenser is not used, in an indoor air conditioning apparatus to which the integrated thermal management circuit for vehicles according to various exemplary embodiments of the present disclosure is applied.
Figure 4:
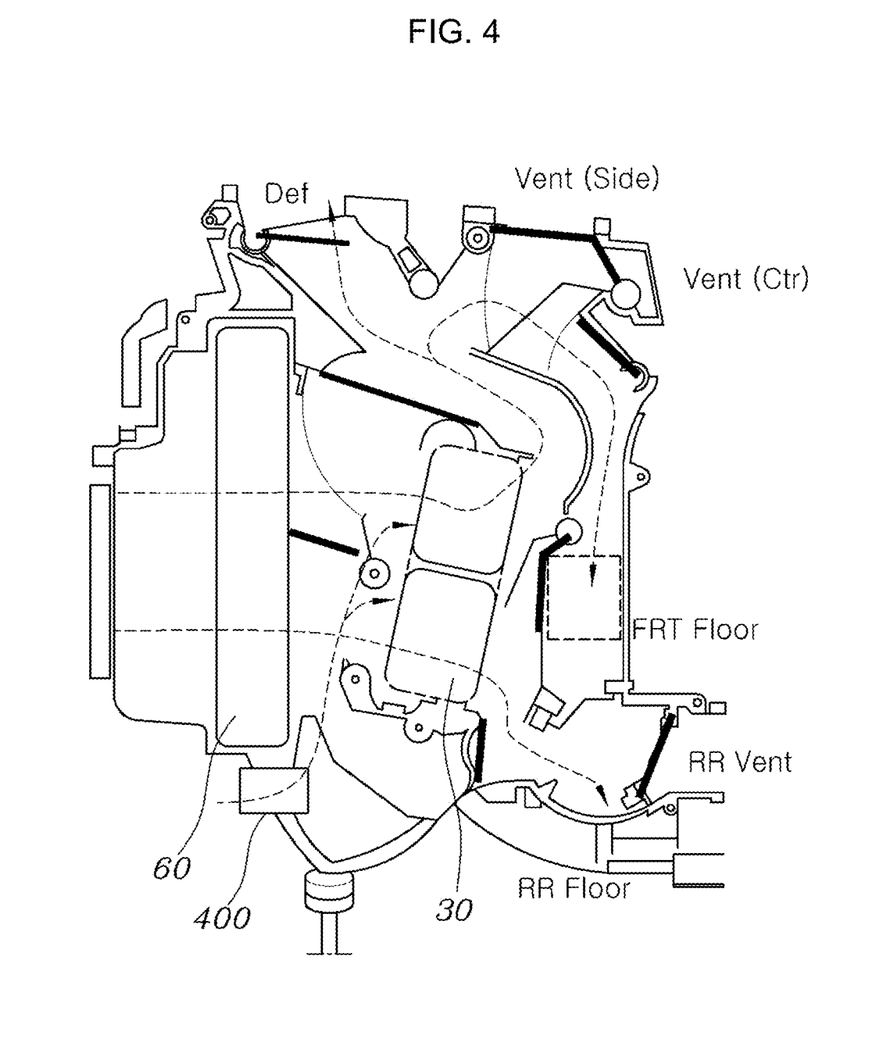
FIG. 4 is a view exemplarily illustrating air flow and refrigerant flow when the internal condenser is used, in the indoor air conditioning apparatus to which the integrated thermal management circuit for vehicles according to various exemplary embodiments of the present disclosure is applied.
Figure 5:
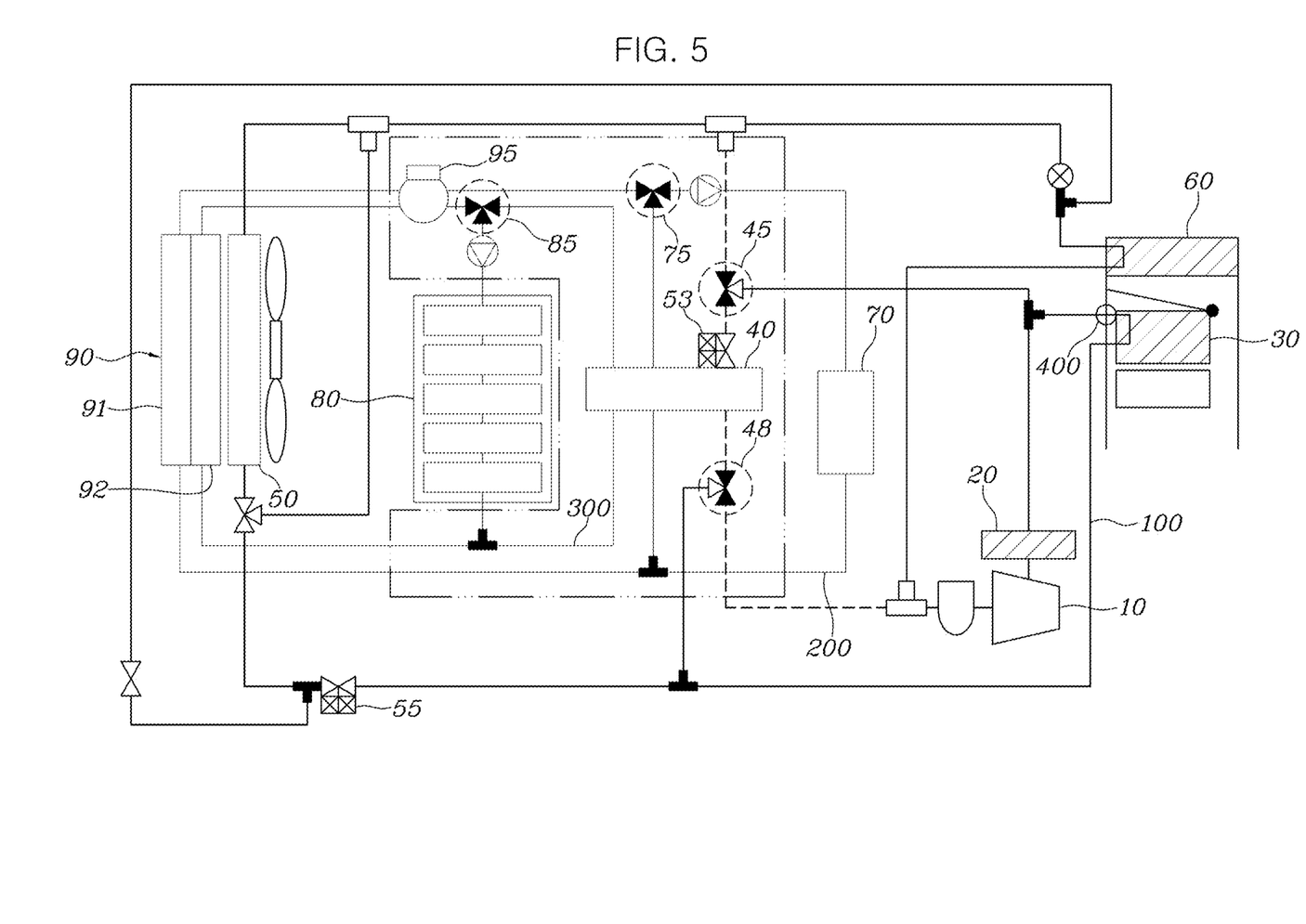
FIG. 5 is a view exemplarily illustrating an internal heating mode of a vehicle in the integrated thermal management circuit for vehicles according to various exemplary embodiments of the present disclosure.
Figure 6:
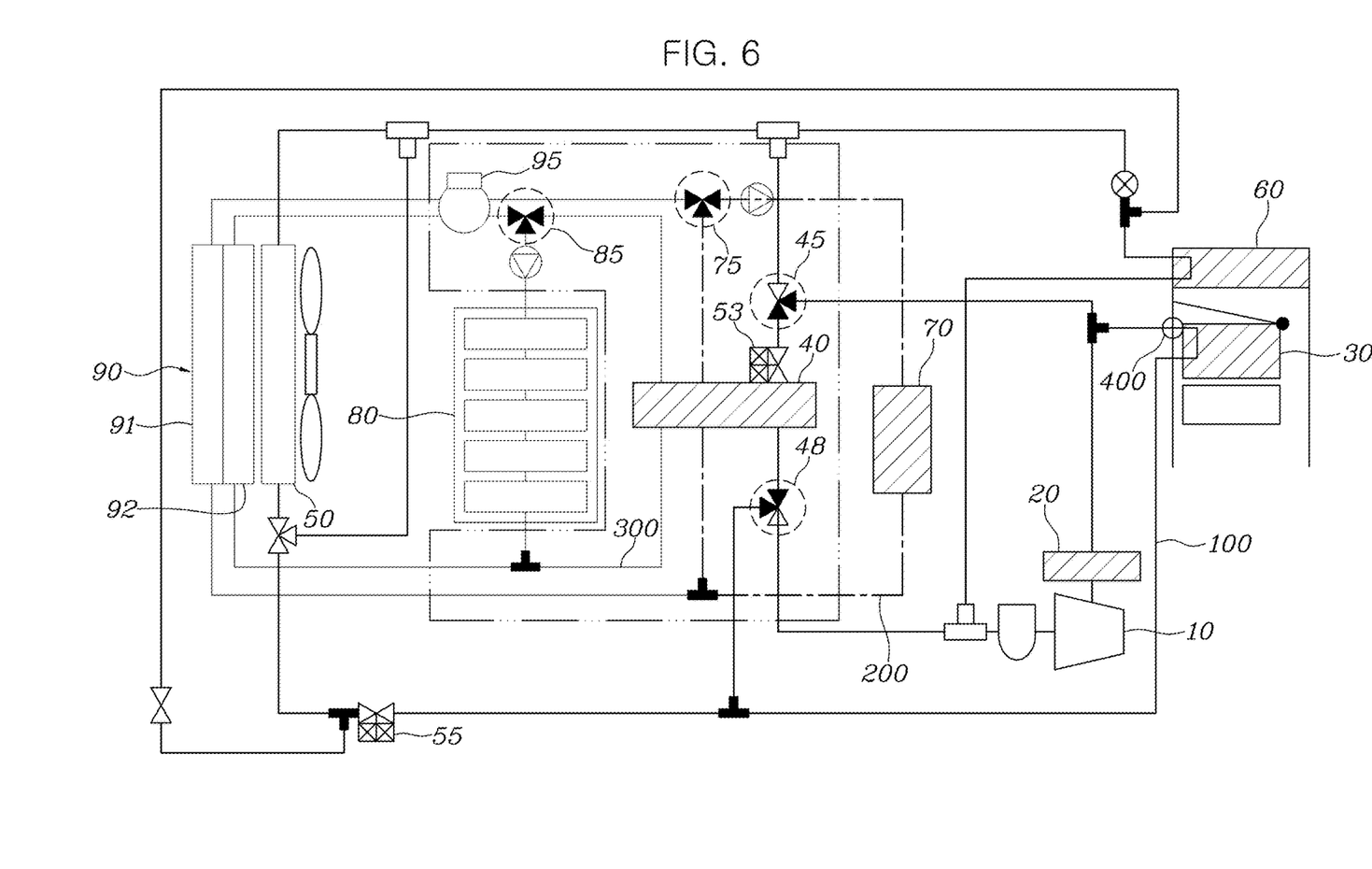
FIG. 6 is a view exemplarily illustrating an internal heating and battery temperature rise mode of the vehicle in the integrated thermal management circuit for vehicles according to various exemplary embodiments of the present disclosure.

FIG. 1 is a schematic view exemplarily illustrating an integrated thermal management circuit for vehicles according to various exemplary embodiments of the present disclosure. FIG. 2 is a view exemplarily illustrating a first flow path and a second flow path of an internal condenser in the integrated thermal management circuit for vehicles according to various exemplary embodiments of the present disclosure. FIG. 3 is a view exemplarily illustrating air flow when the internal condenser is not used, in an indoor air conditioning apparatus to which the integrated thermal management circuit for vehicles according to various exemplary embodiments of the present disclosure is applied. FIG. 4 is a view exemplarily illustrating air flow and refrigerant flow when the internal condenser is used, in the indoor air conditioning apparatus to which the integrated thermal management circuit for vehicles according to various exemplary embodiments of the present disclosure is applied. FIG. 5 is a view exemplarily illustrating an internal heating mode of a vehicle in the integrated thermal management circuit for vehicles according to various exemplary embodiments of the present disclosure. FIG. 6 is a view exemplarily illustrating an internal heating and battery temperature rise mode of the vehicle in the integrated thermal management circuit for vehicles according to various exemplary embodiments of the present disclosure.

FIG. 1 is a schematic view exemplarily illustrating the integrated thermal management circuit for vehicles according to various exemplary embodiments of the present disclosure. The integrated thermal management circuit for vehicles according to various exemplary embodiments of the present disclosure includes a refrigerant line 100 configured so that a refrigerant subsequently flows into a compressor 10 and a refrigerant heater 20, the refrigerant discharged from the refrigerant heater 20 passes through an internal condenser 30 of an indoor air conditioning apparatus or an integrated chiller 40 and then flows into an external condenser 50, and the refrigerant discharged from the external condenser 50 passes through the integrated chiller 40 or an evaporator 60 of the indoor air conditioning apparatus and then flows into the compressor 10, a battery cooling line 200 configured so that a coolant circulates between a battery 70 and an integrated radiator 90 or between the battery 70 and the integrated chiller 40, an electronic part cooling line 300 configured so that the coolant circulates between an electronic driving unit 80 and the integrated radiator 90 or between the electronic driving unit 80 and the integrated chiller 40, and a heat radiation control valve 400 provided between the refrigerant heater 20 and the internal condenser 30 on the refrigerant line 100 and configured to adjust the flow rate of the refrigerant flowing into the internal condenser 30 to control the amount of heat radiated by the internal condenser 30 during heating of the interior of a vehicle. In addition, an integrated reservoir tank 95 may be connected to the battery cooling line 200 and the electronic part cooling line 300.

In the integrated thermal management circuit for vehicles according to various exemplary embodiments of the present disclosure, the integrated radiator 90 may include an electronic part radiator 92 connected to the electronic part cooling line 300 and a battery radiator 91 connected to the battery cooling line 200, and the electronic part radiator and the battery radiator may be individually provided as respective parts or may be integrated into one part. That is, the integrated radiator 90 may be provided as an apparatus into which an electronic part radiator required by the electronic driving unit 80 and a battery radiator required by the battery 70 are integrated so that a plurality of coolant flow paths is formed, or may be individually provided as respective apparatuses in which coolant flow paths are formed.

Furthermore, in the integrated thermal management circuit for vehicles according to various exemplary embodiments of the present disclosure, the refrigerant, evaporated by the integrated chiller 40 or the evaporator 60, on the refrigerant line 100 may be compressed by the compressor 10, may be heated by the refrigerant heater 20, and may be cooled while sequentially passing through the internal condenser 30 and the external condenser 50, or may be cooled while sequentially passing through the integrated chiller 40 and the external condenser 50.

In contrast to a conventional thermal management circuit configured to perform battery temperature rise through a coolant heater, the integrated thermal management circuit for vehicles according to various exemplary embodiments of the present disclosure directly heats the refrigerant through the refrigerant heater 20, and performs heat exchange between the heated refrigerant and the coolant on the battery cooling line 200 in the integrated chiller 40, raising the temperature of the battery 70. Therefore, the number of separate lines, valves, pipes, etc. configured to raise the temperature of the battery 70 is reduced, and accordingly, cost reduction, increase in space utilization of an engine compartment, and simplification in thermal management control may be obtained.

FIG. 2 is a view exemplarily illustrating the first flow path and the second flow path of the internal condenser in the integrated thermal management circuit for vehicles according to various exemplary embodiments of the present disclosure. In the integrated thermal management circuit for vehicles according to various exemplary embodiments of the present disclosure, the refrigerant heater 20 may heat the refrigerant discharged from the compressor 10 and supply the heated refrigerant to the internal condenser 30, and the heat radiation control valve 400 may control the temperature of the refrigerant supplied to the internal condenser 30 by adjusting the flow rate of the heated refrigerant.

Concretely, the refrigerant heated by the refrigerant heater 20 may branch toward the integrated chiller 40 to be used to raise the temperature of the battery 70, or may flow into the internal condenser 30 to be used to heat the interior of the vehicle. Here, the heat radiation control valve 400 may be provided at the inlet of the internal condenser 30 to adjust the flow rate of the refrigerant flowing into the internal condenser 30, and the temperature of the refrigerant 30 flowing into the internal condenser 30 may be controlled based on adjustment of the flow rate of the refrigerant.

For example, when the flow rate of the heated refrigerant is increased, the temperature of the refrigerant flowing into the internal condenser 30 may be raised and the amount of radiated heat may be increased, and when the flow rate of the heated refrigerant is decreased, the temperature of the refrigerant flowing into the internal condenser 30 may be lowered and the amount of the radiated heat may be decreased. in heating of the interior of the vehicle performed by the internal condenser 30, a target heating temperature may be obtained in accordance with the amount of the heat radiated by the internal condenser 30.

FIG. 3 is a view exemplarily illustrating air flow when the internal condenser is not used, in the indoor air conditioning apparatus to which the integrated thermal management circuit for vehicles according to various exemplary embodiments of the present disclosure is applied. FIG. 4 is a view exemplarily illustrating air flow and refrigerant flow when the internal condenser is used, in the indoor air conditioning apparatus to which the integrated thermal management circuit for vehicles according to various exemplary embodiments of the present disclosure is applied. The first flow path and the second flow path which are separated from each other so that the refrigerant independently flows therein may be provided in the internal condenser 30 of the integrated thermal management circuit for vehicles according to various exemplary embodiments of the present disclosure, and the heat radiation control valve 400 may distribute the refrigerant discharged from the refrigerant heater 20 to supply the refrigerant to the first flow path and the second flow path, and may adjust the flow rates of the refrigerant supplied to the first flow path and the second flow path.

Furthermore, in the internal condenser 30 of the integrated thermal management circuit for vehicles according to various exemplary embodiments of the present disclosure, the first flow path and the second flow path of the internal condenser 30 respectively radiate heat during heating of the interior of the vehicle, the heat radiated by the first flow path may be used to heat seats in the first row, and the heat radiated by the second flow path may be used to heat seats in the second row.

That is, to implement a heating temperature desired by a user during heating of the interior of the vehicle, hot air obtained by an internal condenser and cold air obtained by an evaporator were conventionally combined to implement the desired heating temperature, but, in the integrated thermal management circuit for vehicles according to various exemplary embodiments of the present disclosure, the temperature of heat radiated by the internal condenser 30 may be controlled by adjusting the flow rate of the refrigerant heated by the refrigerant heater 20, and the temperature of heated air may be determined in accordance with the amount of radiated heat.

Therefore, the integrated thermal management circuit for vehicles according to various exemplary embodiments of the present disclosure may effectively heat the interior of the vehicle compared to the conventional thermal management circuit, and may adjust the flow rates of the refrigerant flowing into the first flow path and the second flow path, which are independently provided in the internal condenser 30, being configured for independently implementing heating of the seats in the first row corresponding to the front seats through the first flow path and heating of the seats in the second row corresponding to the rear seats through the second flow path at separate temperatures.

FIG. 5 is a view exemplarily illustrating the internal heating mode of the vehicle in the integrated thermal management circuit for vehicles according to various exemplary embodiments of the present disclosure. FIG. 6 is a view exemplarily illustrating the internal heating and battery temperature rise mode of the vehicle in the integrated thermal management circuit for vehicles according to various exemplary embodiments of the present disclosure. FIG. 5 illustrates a case that heating of the interior of the vehicle is performed by the refrigerant heater 20, and the interior of the vehicle may be heated through recovery of the waste heat of the electronic driving unit 80 when the refrigerant flows toward the integrated chiller 40 other than the evaporator 60. Furthermore, FIG. 6 illustrates a case that heating of the interior of the vehicle and rise in the temperature of the battery 70 are simultaneously performed through the refrigerant heated by the refrigerant heater 20.

Concretely, on the electronic part cooling line 300 of the integrated thermal management circuit for vehicles according to various exemplary embodiments of the present disclosure, a first control valve 85 is provided at a junction among downstream areas of the integrated radiator 90 and the integrated chiller 40 and an upstream area of the electronic driving unit 80, and the first control valve 85 may open or close a port toward the integrated radiator 90 or a port toward the integrated chiller 40 in accordance with the thermal management mode of the electronic driving unit 80 to adjust the flow of the coolant flowing into the electronic driving unit 80.

Furthermore, in the integrated thermal management circuit for vehicles according to various exemplary embodiments of the present disclosure, the first control valve 85 may be a three-way valve, and the first control valve 85 may close the port toward the integrated chiller 40 in the outdoor air cooling mode of the electronic driving unit 80, and may close the port toward the integrated radiator 90 in the electronic part waste heat recovery mode of the electronic driving unit 80.

In the integrated thermal management circuit for vehicles according to various exemplary embodiments of the present disclosure, a first pump may be provided between the first control valve 85 and the electronic driving unit 80, and the first pump may adjust the flow of the coolant to circulate the coolant in the electronic part cooling line 300 along the electronic part cooling line 300.

Furthermore, on the battery cooling line 200 of the integrated thermal management circuit for vehicles according to various exemplary embodiments of the present disclosure, a second control valve 75 is provided at a junction among downstream areas of the integrated radiator 90 and the integrated chiller 40 and an upstream area of the battery 70, and the second control valve 75 may open or close a port toward the integrated radiator 90 or a port toward the integrated chiller 40 in accordance with the thermal management mode of the battery 70 to adjust the flow of the coolant flowing into the battery 70.

Furthermore, in the integrated thermal management circuit for vehicles according to various exemplary embodiments of the present disclosure, the second control valve 75 may be a three-way valve, and the second control valve 75 may close the port toward the integrated chiller 40 in the outdoor air cooling mode of the battery 70, and may close the port toward the integrated radiator 90 in the chiller cooling mode or the temperature rise mode of the battery 70.

In the integrated thermal management circuit for vehicles according to various exemplary embodiments of the present disclosure, a second pump may be provided between the second control valve 75 and the battery 70, and the second pump may adjust the flow of the coolant to circulate the coolant in the battery cooling line 200 along the battery cooling line 200.

On the refrigerant line 100 of the integrated thermal management circuit for vehicles according to various exemplary embodiments of the present disclosure, a third control valve 45 may be provided at a junction among downstream areas of the refrigerant heater 20 and the external condenser 50 and an upstream area of the integrated chiller 40, and a fourth control valve 48 may be provided at a junction between a downstream area of the integrated chiller 40 and an upstream area of the external condenser 50.

Furthermore, in the integrated thermal management circuit for vehicles according to various exemplary embodiments of the present disclosure, the third control valve 45 and the fourth control valve 48 may open or close ports toward the refrigerant heater 20, ports toward the external condenser 50 or ports toward the compressor 10 in accordance with the thermal management mode of the battery 70 or the cooling or heating mode of the vehicle, being configured for adjusting the flow rate of the refrigerant flowing into the integrated chiller 40.

In the integrated thermal management circuit for vehicles according to various exemplary embodiments of the present disclosure, the third control valve 45 and the fourth control valve 48 may be three-way valves, and the third control valve 45 may close the port toward the external condenser 50 and the fourth control valve 48 may close the port toward the compressor 10 in the temperature rise mode of the battery 70.

Furthermore, in the integrated thermal management circuit for vehicles according to various exemplary embodiments of the present disclosure, the third control valve 45 and the fourth control valve 48 may be three-way valves, and the third control valve 45 may close the port toward the refrigerant heater 20 and the fourth control valve 48 may close the port toward the external condenser 50 in the internal heating mode of the vehicle.

Accordingly, through the control of the first control valve 85, the second control valve 75, the third control valve 45 and the fourth control valve 48 provided downstream of one integrated chiller 40, various operation modes, such as cooling of air outside the electronic parts, recovery of waste heat of the electronic parts, heating of the interior of the vehicle through the heat pump, cooling of air outside the battery 70, cooling of the battery chiller, rise in the temperature of the battery 70, dehumidification, etc., may be independently implemented, and thermal management efficiency of the vehicle may also be improved.

On the refrigerant line 100 of the integrated thermal management circuit for vehicles according to various exemplary embodiments of the present disclosure, an expansion valves 55, 53 and 65 may be provided upstream of the external condenser 50, upstream of the integrated chiller 40 or upstream of the evaporator 60, respectively, and the refrigerant passing through the expansion valve 65 provided upstream of the external condenser 50, upstream of the integrated chiller 40 or upstream of the evaporator 60 may be selectively expanded in accordance with the cooling or heating mode of the vehicle.

Furthermore, on the battery cooling line 200 of the integrated thermal management circuit for vehicles according to various exemplary embodiments of the present disclosure, when the battery temperature rise mode is performed, the coolant circulating along the battery cooling line 200 may exchange heat with the refrigerant, heated by the refrigerant heater 200, in the integrated chiller 400, being configured for raising the temperature of the battery 70.

Furthermore, in the integrated thermal management circuit for vehicles according to various exemplary embodiments of the present disclosure, the expansion valve may be provided upstream of the external condenser 50, and the refrigerant circulating along the refrigerant line 100 may be compressed by the compressor 10, may be condensed by the integrated chiller 40, may be expanded by the expansion valve provided upstream of the external condenser 50 and may be evaporated by the external condenser 50, being configured for implementing the battery temperature rise mode.

As is apparent from the above description, in an integrated thermal management circuit for vehicles according to an exemplary embodiment of the present disclosure, a refrigerant line, a battery cooling line and an electronic part cooling line may be respectively provided, recovery of waste heat of an electronic driving unit and cooling of a battery may be performed through one integrated chiller, various thermal management modes, such as heating of the interior of a vehicle through a heat pump, rise in the temperature of the battery, etc., may be independently performed by directly heating a refrigerant discharged from a compressor through a refrigerant heater, and heating temperatures of front seats and rear seats may be respectively adjusted during heating of the interior of the vehicle by controlling the flow rate of the refrigerant heated by the refrigerant heater at the inlet of an internal condenser including two independent flow paths.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

Furthermore, the term of "fixedly connected" signifies that fixedly connected members always rotate at a same speed. Furthermore, the term of "selectively connectable" signifies "selectively connectable members rotate separately when the selectively connectable members are not engaged to each other, rotate at a same speed when the selectively connectable members are engaged to each other, and are stationary when at least one of the selectively connectable members is a stationary member and remaining selectively connectable members are engaged to the stationary member".

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An integrated thermal management apparatus for vehicles, the apparatus comprising:
   a refrigerant line to which a compressor, a refrigerant heater, an internal condenser, an integrated chiller and an external condenser are mounted, wherein a refrigerant sequentially flows from the compressor to the refrigerant heater through the refrigerant line and the refrigerant discharged from the refrigerant heater passes through the internal condenser of an indoor air conditioning apparatus or the integrated chiller and then flows into the external condenser, and the refrigerant discharged from the external condenser passes through the integrated chiller or an evaporator of the indoor air conditioning apparatus and then flows into the compressor;
   a battery cooling line, to which a battery, an integrated radiator and the integrated chiller are mounted, wherein a coolant circulates between the battery and the integrated radiator or between the battery and the integrated chiller;
   an electronic part cooling line, to which an electronic driving unit, the integrated radiator and the integrated chiller are mounted, wherein the coolant circulates between the electronic driving unit and the integrated radiator or between the electronic driving unit and the integrated chiller; and
   a heat radiation control valve provided between the refrigerant heater and the internal condenser on the refrigerant line and configured to adjust a flow rate of the refrigerant flowing into the internal condenser to control an amount of heat radiated by the internal condenser during heating of an interior of a vehicle,
   wherein the refrigerant heater heats the refrigerant discharged from the compressor and supplies the heated refrigerant to the internal condenser, and the heat radiation control valve is configured to control a temperature of the refrigerant supplied to the internal condenser by adjusting a flow rate of the heated refrigerant.

2. The integrated thermal management apparatus of claim 1, wherein the refrigerant, evaporated by the integrated chiller or the evaporator, on the refrigerant line is compressed by the compressor, is heated by the refrigerant heater, and is cooled while sequentially passing through the internal condenser and the external condenser, or is cooled while sequentially passing through the integrated chiller and the external condenser.

3. The integrated thermal management apparatus of claim 1, wherein a first flow path and a second flow path separated from each other so that the refrigerant independently flows therein are provided in the internal condenser, and the heat radiation control valve is configured to distribute the refrigerant discharged from the refrigerant heater to supply the refrigerant to the first flow path and the second flow path, and to adjust flow rates of the refrigerant supplied to the first flow path and the second flow path.

4. The integrated thermal management apparatus of claim 1, wherein a control valve is provided at a junction among downstream areas of the integrated radiator and the integrated chiller and an upstream area of the electronic driving unit, and the control valve is configured to open or close a port toward the integrated radiator or a port toward the integrated chiller in accordance with a thermal management mode of the electronic driving unit to adjust flow of the coolant flowing into the electronic driving unit.

5. The integrated thermal management apparatus of claim 4, wherein the control valve is a three-way valve, and the control valve is configured to close the port toward the integrated chiller in an outdoor air cooling mode of the electronic driving unit, and to close the port toward the integrated radiator in an electronic part waste heat recovery mode of the electronic driving unit.

6. The integrated thermal management apparatus of claim 1, wherein a control valve is provided at a junction among downstream areas of the integrated radiator and the integrated chiller and an upstream area of the battery, and the control valve is configured to open or close a port toward the integrated radiator or a port toward the integrated chiller in accordance with a thermal management mode of the battery to adjust flow of the coolant flowing into the battery.

7. The integrated thermal management apparatus of claim 6, wherein the control valve is a three-way valve, and the control valve is configured to close the port toward the integrated chiller in an outdoor air cooling mode of the battery, and to close the port toward the integrated radiator in a chiller cooling mode or a temperature rise mode of the battery.

8. The integrated thermal management apparatus of claim 1, wherein a control valve is provided at a junction among downstream areas of the refrigerant heater and the external condenser and an upstream area of the integrated chiller, and an additional control valve is provided at a junction between a downstream area of the integrated chiller and an upstream area of the external condenser.

9. The integrated thermal management apparatus of claim 8, wherein the control valve and the additional control valve are configured to open or close ports toward the refrigerant heater, ports toward the external condenser or ports toward the compressor in accordance with a thermal management mode of the battery or a cooling or heating mode of the vehicle to adjust a flow rate of the refrigerant flowing into the integrated chiller.

10. The integrated thermal management apparatus of claim 9, wherein the control valve and the additional control valve are three-way valves, and the control valve is configured to close the port toward the external condenser and the additional control valve is configured to close the port toward the compressor in a temperature rise mode of the battery.

11. The integrated thermal management apparatus of claim 9, wherein the control valve and the additional control valve are three-way valves, and the control valve is configured to close the port toward the refrigerant heater and the additional control valve is configured to close the port toward the external condenser in an internal heating mode of the vehicle.

12. The integrated thermal management apparatus of claim 1, wherein an expansion valve is provided upstream of the external condenser, upstream of the integrated chiller or upstream of the evaporator, and the refrigerant passing through the expansion valve provided upstream of the external condenser, upstream of the integrated chiller or upstream of the evaporator is selectively expanded in accordance with a cooling or heating mode of the vehicle.

13. The integrated thermal management apparatus of claim 1, wherein, when a battery temperature rise mode is performed on the battery cooling line, the coolant circulating along the battery cooling line exchanges heat with the refrigerant, heated by the refrigerant heater, in the internal condenser or in the integrated chiller to raise a temperature of the battery.

14. The integrated thermal management apparatus of claim 13, wherein an expansion valve is provided upstream of the external condenser, and the refrigerant circulating along the refrigerant line is compressed by the compressor, is condensed by the internal condenser or by the integrated chiller, is expanded by the expansion valve provided upstream of the external condenser and is evaporated by the external condenser to implement the battery temperature rise mode.

15. The integrated thermal management apparatus of claim 1, wherein the integrated radiator includes an electronic part radiator connected to the electronic part cooling line and a battery radiator connected to the battery cooling line, and the electronic part radiator and the battery radiator are individually provided as respective portions or are integrated into one part.

* * * * *